United States Patent
Reed

(10) Patent No.: US 9,956,658 B1
(45) Date of Patent: May 1, 2018

(54) POSITIONING WORK STOP

(71) Applicant: Daniel Reed, Pleasant Plain, OH (US)

(72) Inventor: Daniel Reed, Pleasant Plain, OH (US)

( * ) Notice: Subject to any disclaimer, the term of this patent is extended or adjusted under 35 U.S.C. 154(b) by 396 days.

(21) Appl. No.: 14/663,839

(22) Filed: Mar. 20, 2015

(51) Int. Cl.
 *B23Q 3/00* (2006.01)
 *B23Q 3/18* (2006.01)

(52) U.S. Cl.
 CPC .................. *B23Q 3/186* (2013.01)

(58) Field of Classification Search
 USPC .......................... 269/315, 317, 320
 See application file for complete search history.

(56) References Cited

U.S. PATENT DOCUMENTS

| | | | |
|---|---|---|---|
| 2,769,493 A * | 11/1956 | Karsoe | B21D 43/26 269/316 |
| 3,022,994 A * | 2/1962 | Eklund | B23Q 3/002 269/203 |
| 3,613,981 A | 10/1971 | Ramseier | |
| 3,730,296 A | 5/1973 | Huigens | |
| 3,849,669 A | 11/1974 | Weston | |
| 3,876,196 A * | 4/1975 | Naggert | B65B 7/285 269/304 |
| 3,958,479 A | 5/1976 | Leibinger | |
| 4,023,084 A | 5/1977 | Owa | |
| 4,246,577 A | 1/1981 | Shima et al. | |
| 4,405,421 A | 9/1983 | Inoue | |
| 4,678,976 A | 7/1987 | Inoue | |
| 5,802,937 A | 9/1998 | Day et al. | |
| 5,860,900 A | 1/1999 | Dunning et al. | |
| 5,895,184 A | 4/1999 | Walters et al. | |
| 6,140,931 A | 10/2000 | Yamane et al. | |
| 6,328,507 B1 * | 12/2001 | Shoda | B23Q 1/032 269/21 |
| 6,543,973 B2 | 4/2003 | Lapikas et al. | |
| 7,013,775 B1 | 3/2006 | Song et al. | |
| 7,104,866 B2 | 9/2006 | Yamane et al. | |
| 7,173,691 B2 | 2/2007 | Murphy et al. | |
| 7,351,019 B2 | 4/2008 | Bosker et al. | |
| 8,207,697 B1 | 6/2012 | Reed | |

* cited by examiner

*Primary Examiner* — Joseph J Hail
*Assistant Examiner* — Shantese McDonald
(74) *Attorney, Agent, or Firm* — Mark F. Smith; Smith Brandenburg Ltd

(57) ABSTRACT

The present invention is a positioning work stop for use with a with a machining apparatus for performing a machining operation on a work piece, the positioning work stop comprising a retractable element having an extended position for contacting a work piece to ensure that the work piece is in its proper position for machining and a retracted position that provides a gap between the positioning work stop and the work piece, a biasing element that exerts a rearward biasing force of the retractable element, and a stop pin, wherein during the machining operation, when the machining apparatus contacts the stop pin the rearward biasing force automatically moves the retractable element into its retracted position creating a gap between the positioning work stop and the work piece.

12 Claims, 5 Drawing Sheets

POSITIONING WORK STOP

BACKGROUND OF THE INVENTION

The present invention is directed to a positioning work stop and more particularly to a positioning work stop for use with a machine tool in performing a precision machining operation and which operates to allow an operator to place a work piece in its proper position for machining and further operates to retract out of contact with the work piece to create a gap between the positioning work stop and the work piece to allow for uninterrupted machining.

Computerized numerical controls (CNC) and other well-known machine tools are used to perform various machining operations. Before a machining operation can be performed, the work piece to be machined must be properly placed and held in a mounting fixture for positioning the work piece at a desired location relative to the machining tool. This is particularly important when the machining process is being performed on a CNC machine where the position of the work piece must align with the zero reference point programmed into the computer controls. A number of conventional positioning stops have been developed to accomplish the task of ensuring that the work piece is properly positioned.

Most such positioning work stops are relatively simple, manually operated devices whereby the machine operator installs the stop at a desired location and orientation, and sets the stop mechanism. When the work piece is placed in the mounting fixture and the surface makes contact with the stop, the machine operator knows that the work piece is in its proper position for machining. Such stops are typically rigid and if a gap is needed, such as during a cutting operation to allow a portion of a cut to fall away from the work piece such as to prevent the cutting blade from binding, a spacer is often needed to be inserted between the work piece and the stop. The spacer then must be held in place by a holding apparatus. Unfortunately, the use of such spacers is time consuming and work pieces often are jarred during installation of the spacer and may no longer be in its proper position for machining. This is a significant problem when machining highly precision parts. Further, if the work piece shifts out of position it is often not noticed by the operator and the machining continues to be performed. This shifting causes the work piece to be cut or machined out of specification resulting in the work piece being scrapped or reworked. Further, this requires each work piece to be carefully inspected after the machining operation thereby significantly increasing the manufacturing time and cost of operation. Another difficulty with the use of spacers is that typically after the machining operation has started, the operator must hold the work piece in one hand and install the spacer with the other hand ensuring that it is held flat against the work piece while at the same time tightening a holding apparatus to maintain the spacer in position. This process is again time consuming and can result in the work piece being moved slightly out of position.

Accordingly, there is a need for a positioning work stop that can be used with conventional machining apparatus and operates to ensure that the work piece is in its proper position for machining and reduces the likelihood that the work piece will shift out of its proper position. Further, a need exists for a positioning work stop that allows a gap to be easily created between the positioning work stop and the work piece during certain machining operations without interruption of the machining process.

SUMMARY OF THE INVENTION

The present invention is a positioning work stop for use with a machine tool and has a retractable element that operates in a first extended position as a placement indicator effective for contacting a work piece to ensure that the work piece is in its proper position for machining and in a second retracted position to provide a gap between the positioning work stop and the work piece when required.

In a preferred embodiment of the invention the positioning work stop includes a cylindrical barrel for receiving the retractable element and a biasing element that operates to bias the retractable element into its retracted position.

In a preferred embodiment of the invention the biasing element is a spring.

In a preferred embodiment of the invention the positioning work stop further comprises a stationary securing mechanism that operates to secure the positioning work stop in its proper position for contacting the work piece when the work piece is in its proper position for machining.

In a preferred embodiment of the invention the positioning work stop comprises a stop pin that cooperates with the biasing element to retract the retractable element into its retracted position when the stop pin makes contact with a machine tool.

In another preferred embodiment of the invention the positioning work stop the biasing element includes an electronic system for automatically retracting the retractable element when the stop pin makes contact with a machine tool and automatically extends the retractable element when it receives a signal.

In another preferred embodiment of the invention the positioning work stop is removably attached to a positioning fixture.

Other aspects, advantages, and embodiments of the invention will be apparent from the following description, the accompanying drawings and the appended claims.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention is a positioning work stop for use with a machine tool which is effective for ensuring that a work piece to be machined is in its proper position for machining. Further, the positioning work stop includes a retractable element that extends outwardly from a cylindrical barrel and operates to make contact with, the work piece when the work piece is in its proper position for machining and automatically retracts into the cylindrical barrel to create a gap between the retractable element to allow certain machining operations to be performed. In a preferred embodiment, the retractable element will automatically extend back into position for contacting a work piece when directed by a control. Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

In describing the preferred embodiments of the invention as used herein, the terms "operator" means one that operates and controls the machining apparatus. The terms "forward" or "forwardly" refer to the direction towards the work piece; the terms "rearward" or "rearwardly" refer to the direction away from the work piece.

Figure 1:
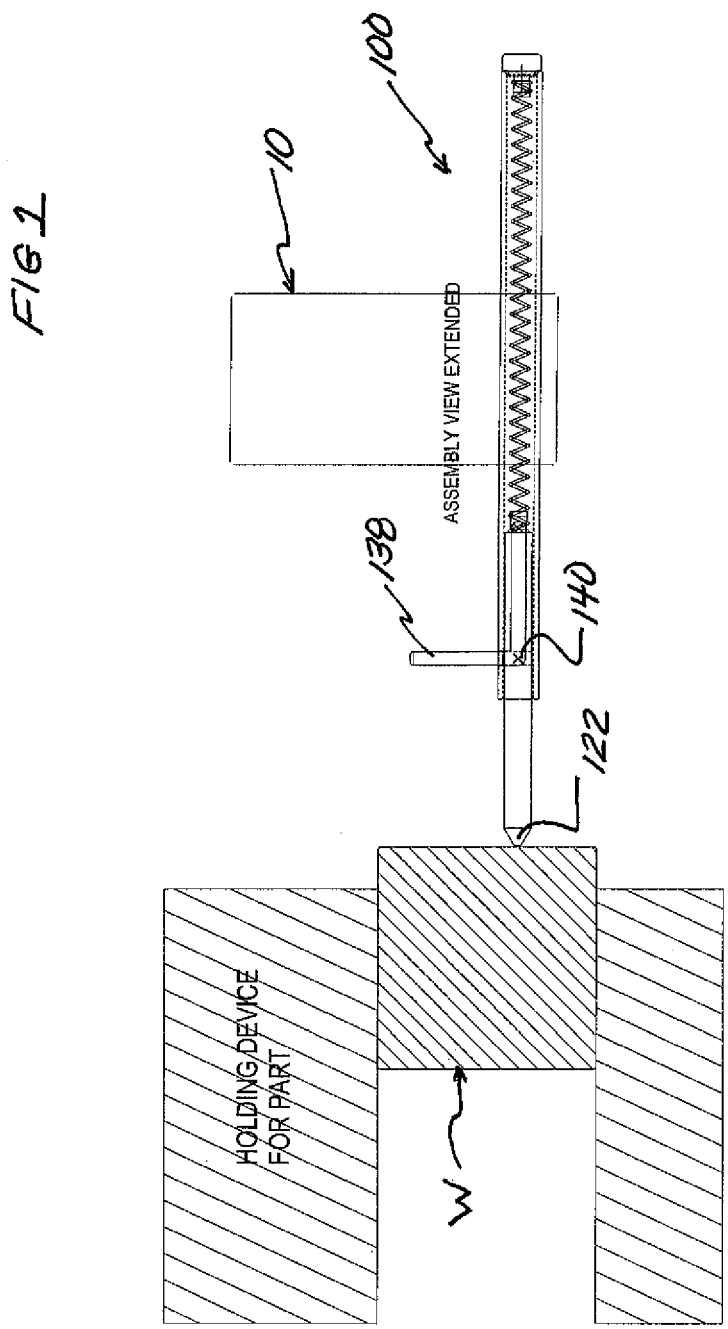
FIG. 1 is a side schematic cut-away view of a preferred embodiment of a positioning work stop showing the retractable element in its extended position for contacting a work piece when the work piece in secured in its proper position for receiving a machining operation.
Figure 2:
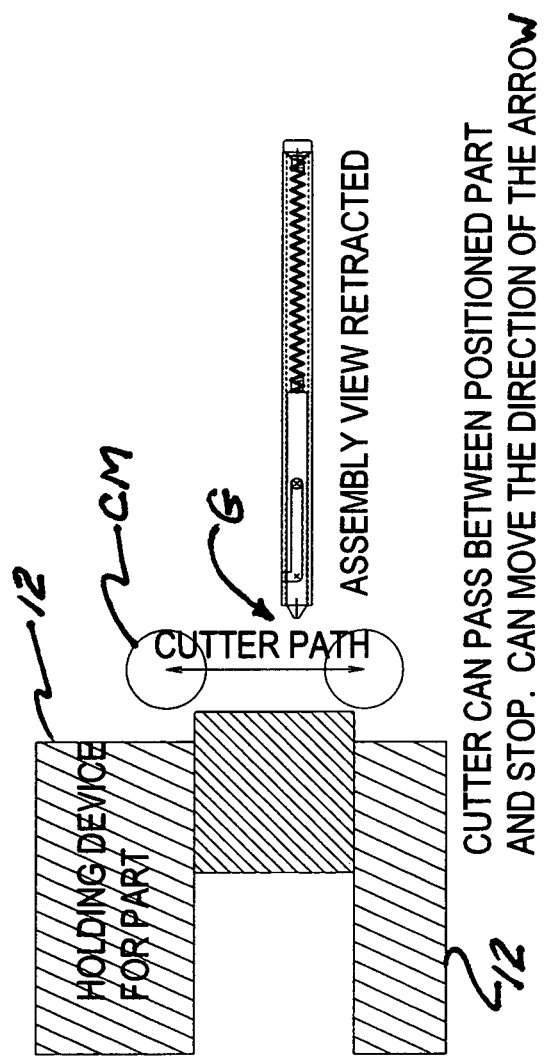
FIG. 2 is a side schematic cut-away view of the positioning work stop of FIG. 1 showing the retractable element in its retracted position creating a gap between the retractable element and the work piece.
Figure 3:
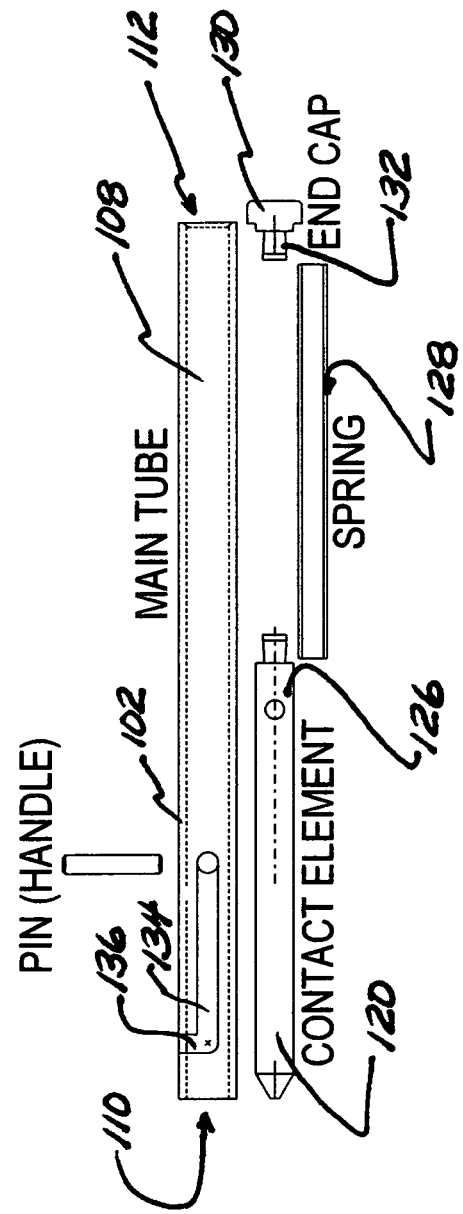
FIG. 3 is a side schematic exploded view of the positioning work stop.

In a preferred embodiment of the invention, as shown in FIGS. 1, 2 and 3, a preferred embodiment of the positioning work stop 100 is shown comprising an outer elongated cylindrical barrel 102 having a forward end 104 and a rearward end 106 and an elongated inner cavity 108 with a forward opening 110 at the forward end 104 and a rearward opening 112 at the rearward end 106 of the cylindrical barrel 102. Positioned along the forward portion 114 (FIG. 4) of the cylindrical barrel 102 is an elongated L-shaped slot 116 (FIG. 3) that extends through the cylindrical barrel 102 into the inner cavity 108.

Slidably positioned within the forward portion 114 of the elongated inner cavity 108 is the retractable element 120 having a forward tip portion 122 and a rearwardly extending protuberance 124 extending longitudinally outwardly from the rearward end 126 of the retractable element 120. Coupled to the rearwardly extending protuberance 124 is a biasing element 128. In a preferred embodiment of the invention the biasing element 128 is in the form of a helical or coil spring. An insert 130 is received in the rearward end 106 of the elongated inner cavity 108 and includes a forwardly extending protuberance 132. Preferably, in the instant embodiment the spring is formed to have a tubular shape with an outer diameter substantially equal to the inner diameter of the cylindrical barrel 102 and having an inner diameter sized for being pressed-fitted onto the rearwardly extending protuberance 124 and the forwardly extending protuberance 132.

As shown, the longitudinally extending L-shaped slot 116 has a first portion 134 and a shorter second portion 136. A stop pin 138 extends radially outwardly through the cylindrical barrel 102 and preferably includes an inner threaded end 140 that mates with a corresponding threaded aperture 142 (FIG. 4) in the retractable element 120. The width of the L-shaped slot 116 is slightly greater than the diameter of the stop pin 138 to allow the stop pin 138 to extend through and travel along the L-shaped slot 116.

Referring to FIG. 1, the positioning work stop 100 is effectively mounted to a conventional securing mechanism 10 on the machining apparatus (not shown). In operation, the operator slides the stop pin 138 along the first portion 134 of the L-shaped slot 116 forwardly to move the retractable element 120 such that it extends outwardly from the forward opening 110 at the forward end 104 of the cylindrical barrel 102. Once the retractable element 120 is moved to its fully extended position, the operator then moves the stop pin 138 into the second portion 136 of the L-shaped slot 116 thereby locking the stop pin 138 and the retractable element 120 in its extended position. It should now be apparent that by moving the stop pin 138 such that the retractable element 120 extends outwardly from the forward opening 110 at the forward end 104 of the cylindrical barrel 102 causes the biasing element 126 in the form of a spring, which is interposed between the rearwardly extending protuberance 122 on the retractable element 118 and the forwardly extending protuberance 130 on the insert 128, to be in an expanded state thereby exerting a force to bias the retractable element 118 rearwardly into the cylindrical barrel 102.

In a preferred embodiment, once the machine operator (not shown) moves the stop pin 138 forwardly such that the retractable element 120 extends outwardly through the forward opening 110 of the cylindrical barrel. 102, the operator then sets the positioning work stop 100 in its proper position on a securing mechanism 10 such that the forward tip portion 122 of the retractable element 120 is in the proper position and location to make, contact with the work piece W. It should be understood that the elongated cylindrical barrel 102 is secured on the securing mechanism 10 such that when the work piece W makes contact with the forward tip portion 122 of the retractable element 120 the work piece W is in its proper position for receiving a machining operation. The work piece W can then be securely positioned in place by use of a conventional holding device 12.

During the machining operation, as illustrated in FIG. 2, once the work piece W and the positioning work stop 100 are properly positioned such that the forward tip portion 122 of the retractable element 120 makes contact with the work piece W, the machining operation can proceed. If the particular machining operation, such as a cutting operation requires a gap G between the work piece W and the positioning work stop 100, an unobstructed path for a machining apparatus, such as a cutting mechanism CM (i.e. a band saw or cut-off saw) to pass can be created by moving the retractable element 120 into its retractable position in the inner cavity 108 of the cylindrical barrel 102. In a preferred embodiment of the invention, during the cutting operation the cutting mechanism CM moves along the surface of the work piece W. As the cutting mechanism CM approaches the positioning work stop 100, it engages the stop pin 138 and pushes it along the second portion 136 of the L-shaped slot 116 until the stop pin 138 reaches the first portion 134 of the L-shaped slot 116 whereby the rearward force being exerted by the biasing element 128 on the retractable element 120 operates to cause the retractable element 120 to move rearwardly into the inner cavity 108 of the cylindrical barrel 102 thereby creating a gap G between the work piece W and the positioning work stop 100.

Figure 4:
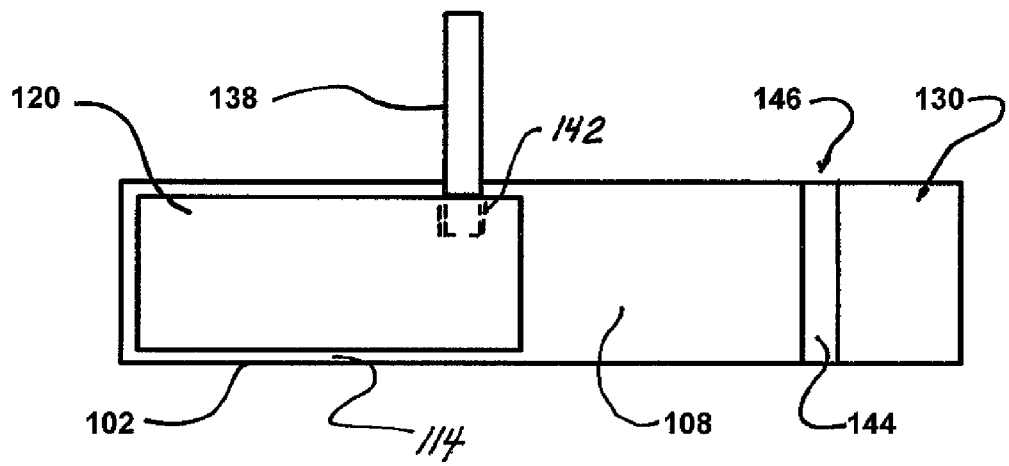
FIG. 4 is a schematic illustration of another preferred embodiment of the positioning work stop of the subject invention showing a biasing element having an electronic system for creating an electromagnet that operates to move the retractable element rearwardly out of contact with the work piece and into the inner cavity of the cylindrical barrel to create a gap between the work piece and the retractable element.
Figure 5:
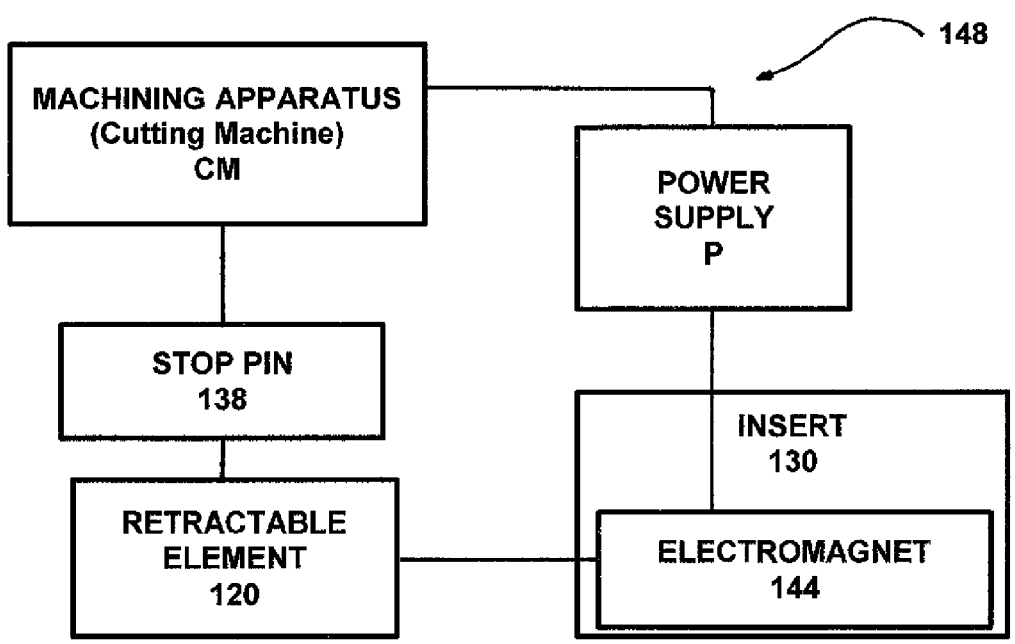
FIG. 5 is an electrical schematic illustration of the positioning work stop of FIG. 4.

In another preferred embodiment, as illustrated in FIGS. 4 and 5, the biasing element 128 is an electronic system that operates to create a force on the retractable element 120 to move it rearwardly into the inner cavity of 108 of the cylindrical barrel 102 when the stop pin 138 makes contact with the a machining apparatus, such as a cutting mechanism CM. In a preferred embodiment, the retractable element 120 or a portion thereof is formed from a ferromagnetic (or ferrimagnetic) material, such as iron or nickel, and the biasing means 128 includes an electromagnet 144 positioned at the forward end 146 of the insert 130. An electrical circuit 148 provides a closed circuit between the power supply P, the stop pin 138, retractable element 120 and the electromagnet 144 such that when the cutting mechanism CM contacts the stop pin 138 it completes the electrical circuit 148 and activates the electromagnet 144. In operation, when activated the electromagnet 144 operates to create a magnetic field that attracts and moves the retractable element 120 rearwardly into its retracted position in the inner cavity 108 forming a gap G between the work piece W and the and the positioning work stop 100.

Figure 6:
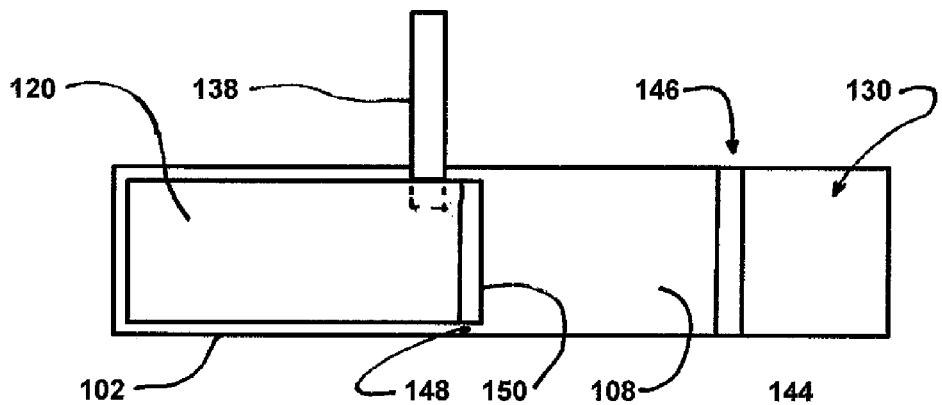
FIG. 6 is a schematic illustration of another preferred embodiment of the positioning work stop of the subject invention showing a biasing element having an electronic system for creating a pair of electromagnets that cooperate to move the retractable element rearwardly out of contact with the work piece and into the inner cavity of the cylindrical barrel to create a gap between the work piece and the retractable element and forwardly into contact with the work piece.
Figure 7:
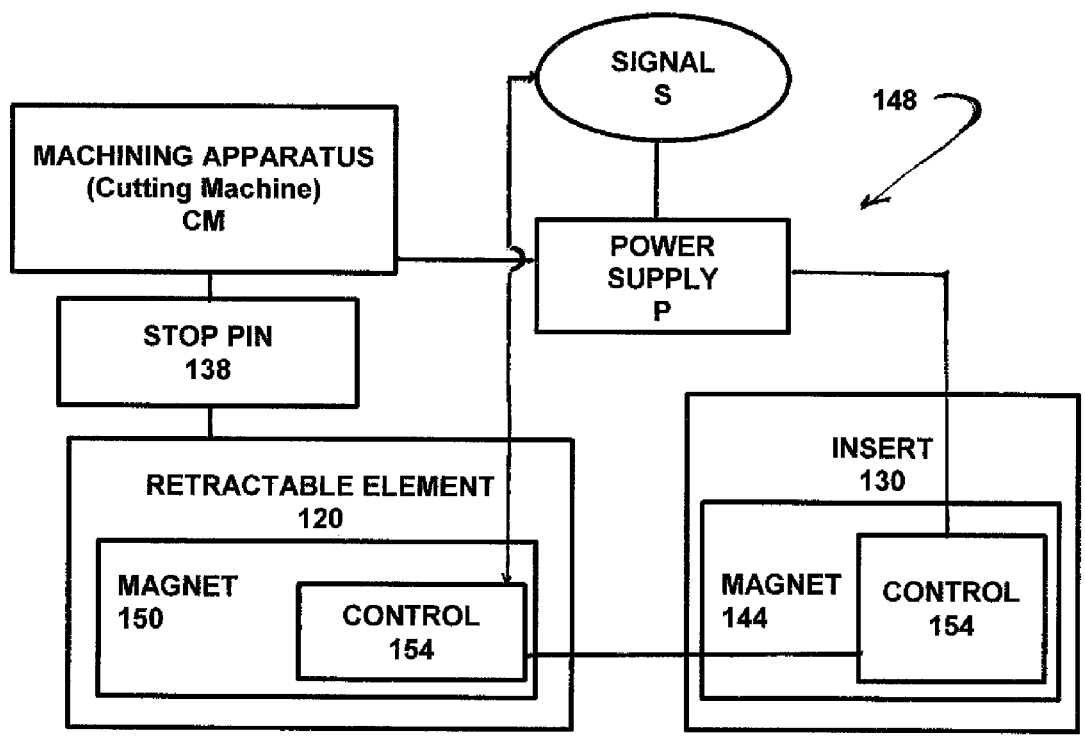
FIG. 7 is an electrical schematic illustration of the positioning work stop of FIG. 6.

In another preferred embodiment of the invention, as illustrated in FIGS. 6 and 7, the biasing element 128 is in the form of an electronic means that operates to create a force on the retractable element 120 to move it rearwardly into the inner cavity of 108 of the cylindrical barrel 102 when the stop pin 138 makes contact with the a machining apparatus, such as a cutting mechanism CM. In a preferred embodiment, the retractable element 120 or a portion thereof and the insert 130 are formed from a ferromagnetic (or ferrimagnetic) material, such as iron or nickel. Preferably, the biasing means 128 includes an electromagnet or permanent magnet 144 is positioned at the rearward end 148 of the retractable element 120 and a permanent magnet or a electromagnet 150 is positioned at the forward end 146 of the insert 130. In operation, when activated the magnet 144 and the operates to create a magnetic field that attracts and moves the retractable element 120 rearwardly into the inner cavity 108 forming a gap G between the work piece W and the positioning work stop 100. When in use, the magnets 144 and 150 would have opposite polarity to retract the retractable element 120 rearwardly into the inner cavity 108 of the cylindrical barrel 102 and would have like polarity to reset the retractable element 120 forwardly out of the inner cavity 108 and back into its extended position in contact with or in position to make contact with the work piece W when a signal S (such as from a control) is received by the power supply P when a gap G is no longer required, such as when the machined work piece is completed and a new work piece is being positioned for receiving a machining operation. This change in polarity can be accomplished electrically or electronically by a control 154 if the magnet is an electromagnet. Alternatively, it should be understood that instead of switching polarity, one of the magnets can be physically turned or flipped, thus bringing different poles into proximity.

It should be understood that in the preferred embodiment of the invention, the positioning work stop of the subject invention is not limited to the positioning fixture described herein but can comprise other similar conventional positioning fixtures and is operational with use with any work piece that is formed from electrically conductive material. It should also be understood that a preferred embodiment, the positioning work stop of the subject invention provides a means for allowing the machine operator to know when the work piece is in its proper position for machine and will automatically disengage from contact from the work piece to allow a gap to be created between the work piece and the positioning work stop to allow certain machining operations to be conducted without interruption or to eliminate the likelihood of binding such as during a sawing operation. It should now be apparent to one skilled in the art that by automatically creating a gap between the work piece and the positioning work stop will significantly reduce the risk of manufacturing errors and the amount of scrap being generated.

As described and shown herein, the positioning work stop for use with a machine tool offers significant advantages over other positioning work stops. The positioning work stop operates as a placement indicator that is effective for ensuring that the work piece to be machined is in its proper position for machining and automatically forms a gap between the work piece and the positioning work stop and can automatically go back to its engagement position with the work piece thereby significantly reducing the labor associated with ensuring the proper placement of the work piece and positioning work stop. In addition, the embodiments described herein provides a positioning work stop that does not require any exposed wires, is relatively inexpensive to manufacture, and is simple and easily installed on a conventional positioning fixture.

I claim:

1. A positioning work stop for use with a machining apparatus for ensuring that a work piece is in its proper position for receiving a machining operation, the positioning work stop comprising:
    a retractable element having an extended position for contacting a work piece to ensure that the work piece is in its proper position for machining and a retracted position that provides a gap between the positioning work stop and the work piece;
    a cylindrical barrel for receiving said retractable element;
    a biasing element that operates to bias the retractable element into its retracted position; and
    a stop pin that cooperates with said biasing element to retract the retractable element into its retracted position when the stop pin makes contact with the machine apparatus during the machining operation.

2. The positioning work stop of claim 1 wherein said biasing element is a spring.

3. The positioning work stop of claim 1 further comprises a stationary securing mechanism that secures the positioning work stop in its proper position for contacting the work piece when the work piece is in its proper position for machining.

4. The positioning work stop of claim 1 further comprising a stop pin and wherein said biasing element is an electronic system that automatically retracts said retractable element into its retracted position when said stop pin makes contact with a machine apparatus and automatically extends the retractable element into its extended position when the biasing element receives a signal.

5. The positioning work stop of claim 1 wherein the positioning work stop is removably attached to a positioning fixture.

6. The positioning work stop of claim 1 wherein the biasing element includes a first electromagnet and a second electromagnetic that cooperate to extend the retractable element to contact the work piece when the work piece is in its proper position for receiving a machining operation and to retract the retractable element to form a gap between the work piece and the retractable element.

7. A positioning work stop for use with a machining apparatus for performing a machining operation on a work piece, the positioning work stop comprising:
- a retractable element having an extended position for contacting a work piece to ensure that the work piece is in its proper position for machining and a retracted position that provides a gap between the positioning work stop and the work piece;
- a cylindrical barrel for receiving said retractable element; and
- a biasing element that exerts a rearward biasing force of said retractable element into its retracted position within said cylindrical barrel;
- a stop pin extending through a slot in said cylindrical barrel and is coupled to said retractable element, wherein said slot having a first portion and a second portion;
- wherein during the machining operation, when the machining apparatus contacts said stop pin, said stop pin slides along said slot from said first portion to said second portion; and wherein when said stop pin slides into said second portion, said rearward biasing force moves said retractable element into said retracted position.

8. The positioning work stop of claim 7 wherein said biasing element is a spring.

9. The positioning work stop of claim 7 further comprises a stationary securing mechanism that secures the positioning work stop in its proper position for contacting the work piece when the work piece is in its proper position for machining.

10. The positioning work stop of claim 7 wherein said biasing element is an electronic system that automatically retracts said retractable element when said stop pin makes contact with a machine apparatus and automatically extends the retractable element when said biasing element receives a signal.

11. The positioning work stop of claim 7 wherein the positioning work stop is removably attached to a positioning fixture.

12. The positioning work stop of claim 7 wherein the biasing element includes a first electromagnet and a second electromagnetic that cooperate to extend the retractable element to contact the work piece when the work piece is in its proper position for receiving a machining operation and to retract the retractable element to form a gap between the work piece and the retractable element.

* * * * *